(No Model.) 5 Sheets—Sheet 1.
J. FARNEN & J. MULLOY.
BRICK MACHINE AND MOLD SANDER.

No. 469,399. Patented Feb. 23, 1892.

Witnesses
W. Rossiter
John L. Jackson.

Inventors
John Farnen
John Mulloy
By Bond & Adams
Attys.

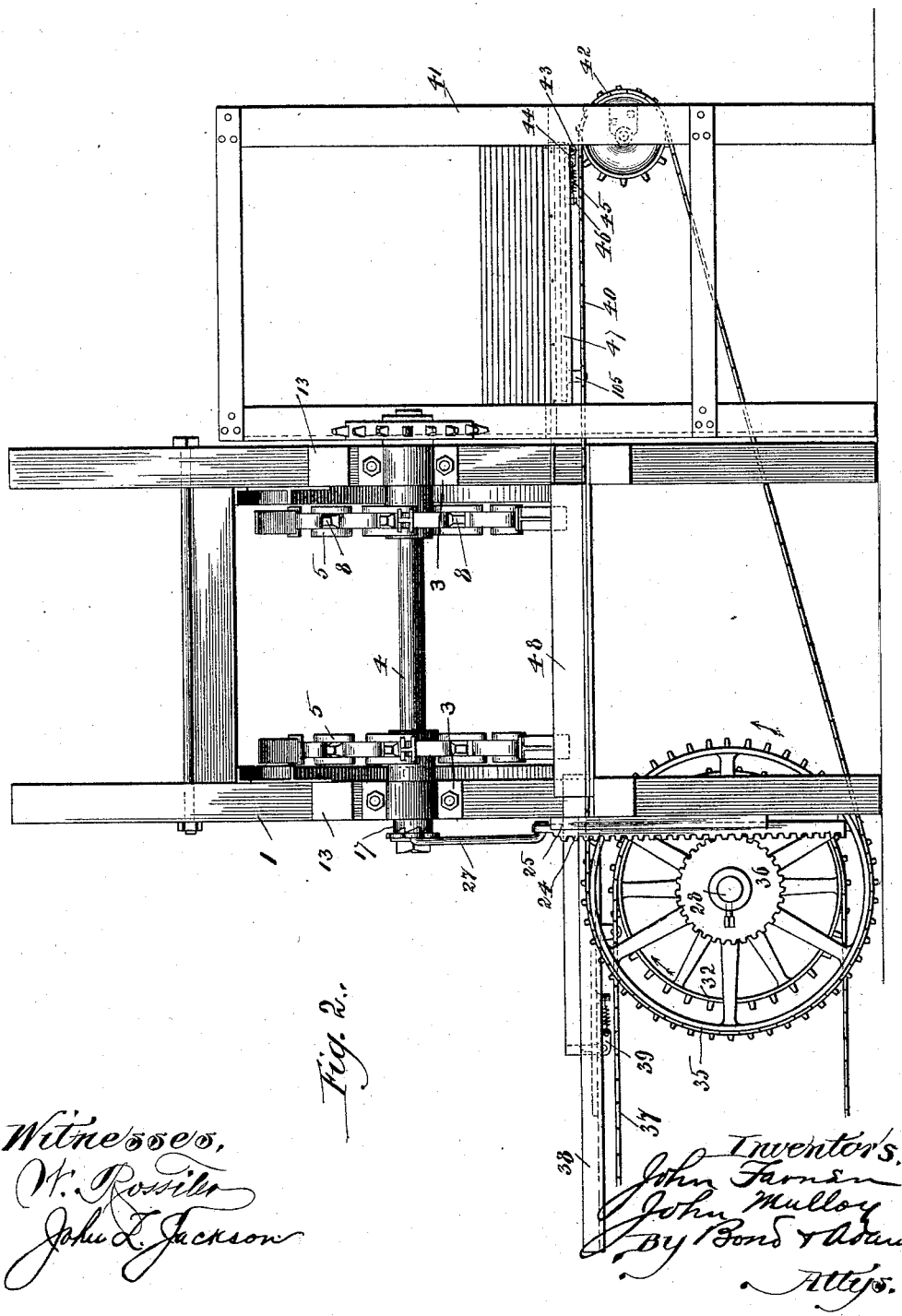

(No Model.) 5 Sheets—Sheet 3.
J. FARNEN & J. MULLOY.
BRICK MACHINE AND MOLD SANDER.
No. 469,399. Patented Feb. 23, 1892.
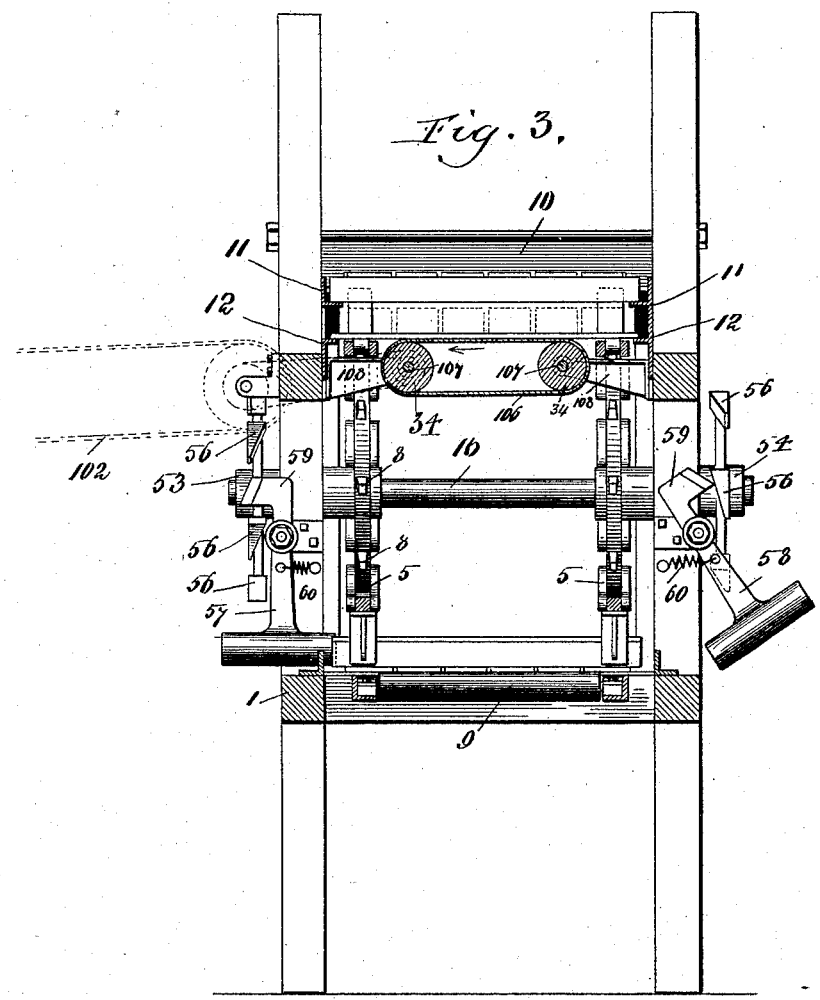
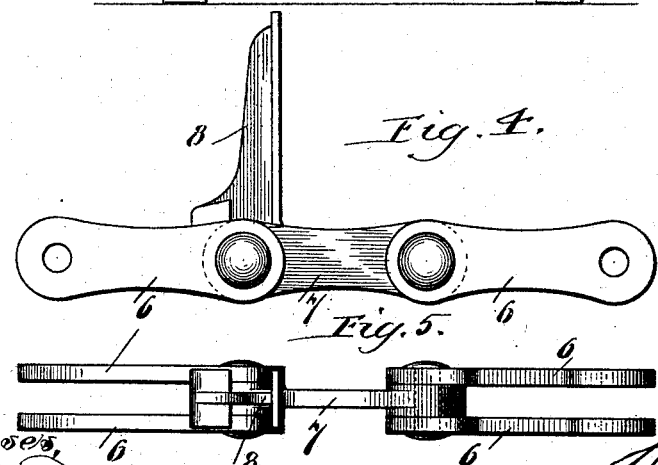

(No Model.) 5 Sheets—Sheet 4.

J. FARNEN & J. MULLOY.
BRICK MACHINE AND MOLD SANDER.

No. 469,399. Patented Feb. 23, 1892.

Witnesses
Inventors
John Farnen
John Mulloy
By Bond & Adams
Att'ys

THE NORRIS PETERS CO., PHOTO-LITHO., WASHINGTON, D. C.

(No Model.)  5 Sheets—Sheet 5.

J. FARNEN & J. MULLOY.
BRICK MACHINE AND MOLD SANDER.

No. 469,399. Patented Feb. 23, 1892.

UNITED STATES PATENT OFFICE.

JOHN FARNEN AND JOHN MULLOY, OF CHICAGO, ILLINOIS.

BRICK-MACHINE AND MOLD-SANDER.

SPECIFICATION forming part of Letters Patent No. 469,399, dated February 23, 1892.

Application filed May 22, 1891. Serial No. 393,779. (No model.)

*To all whom it may concern:*

Be it known that we, JOHN FARNEN and JOHN MULLOY, citizens of the United States, both residing at Chicago, in the county of Cook and State of Illinois, have invented certain new and useful Improvements in Brick-Machines, of which the following is a specification, reference being had to the accompanying drawings, in which—

Figure 1:
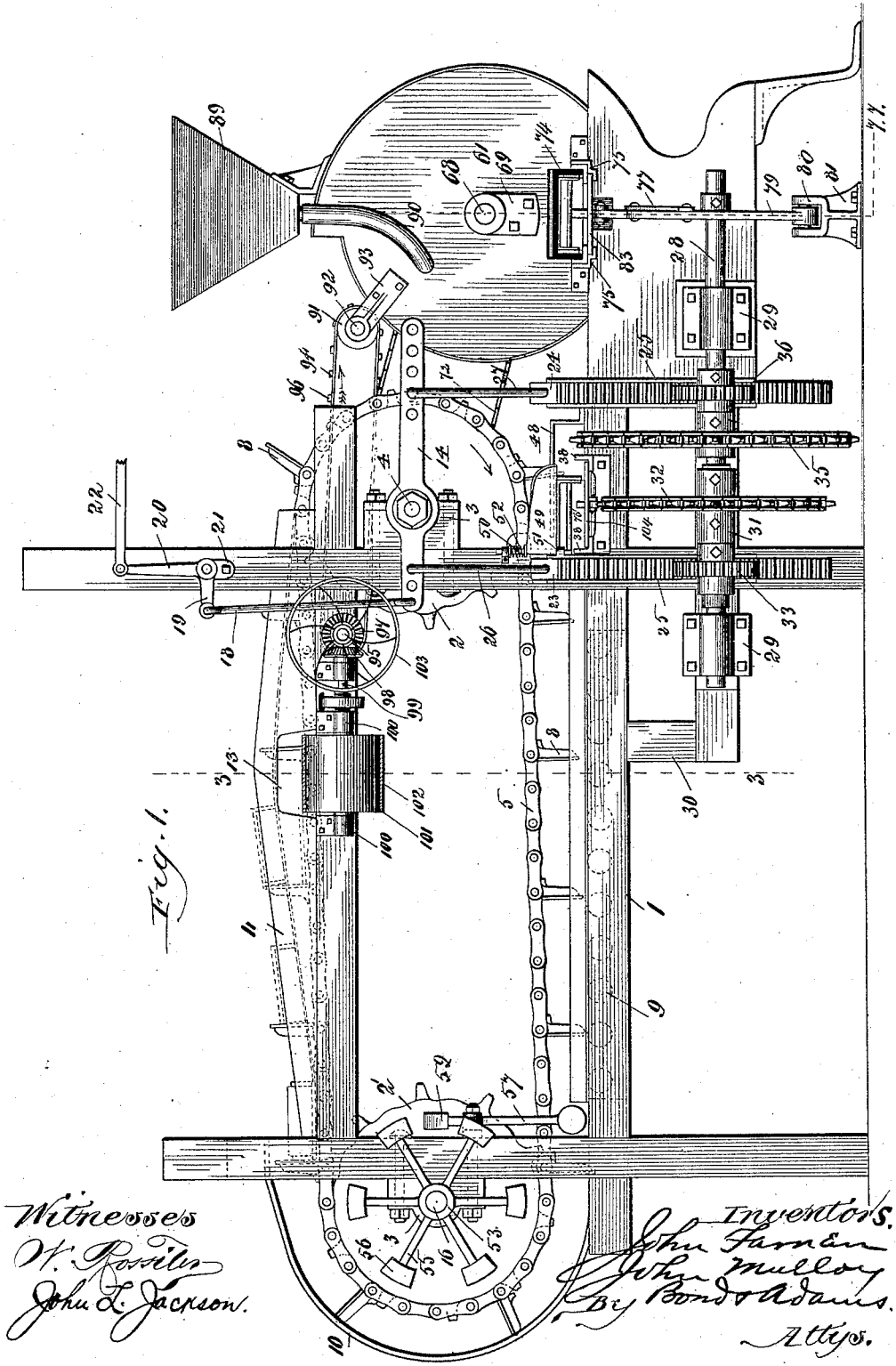
Figure 6:
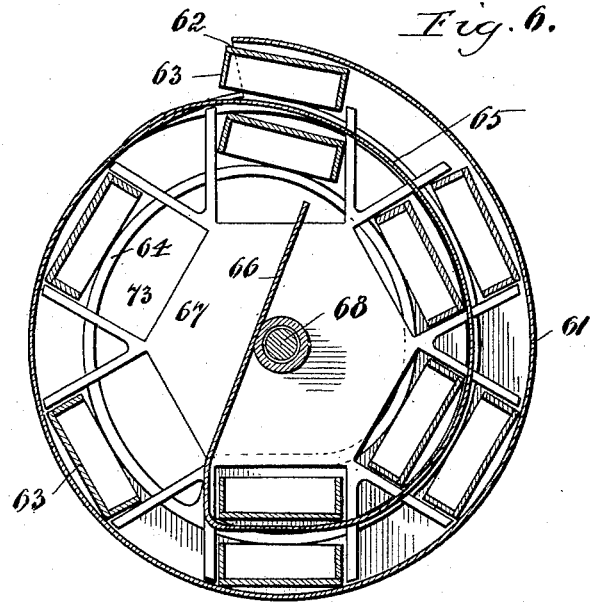
Figure 7:
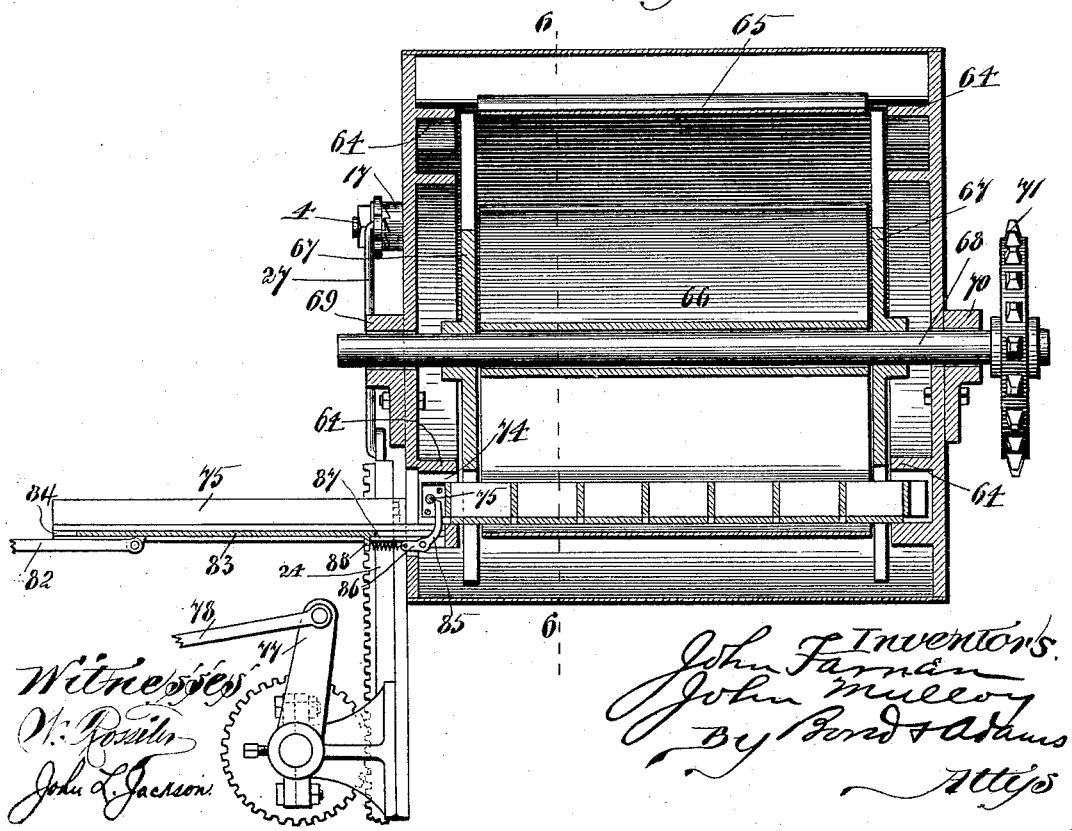
Figure 8:
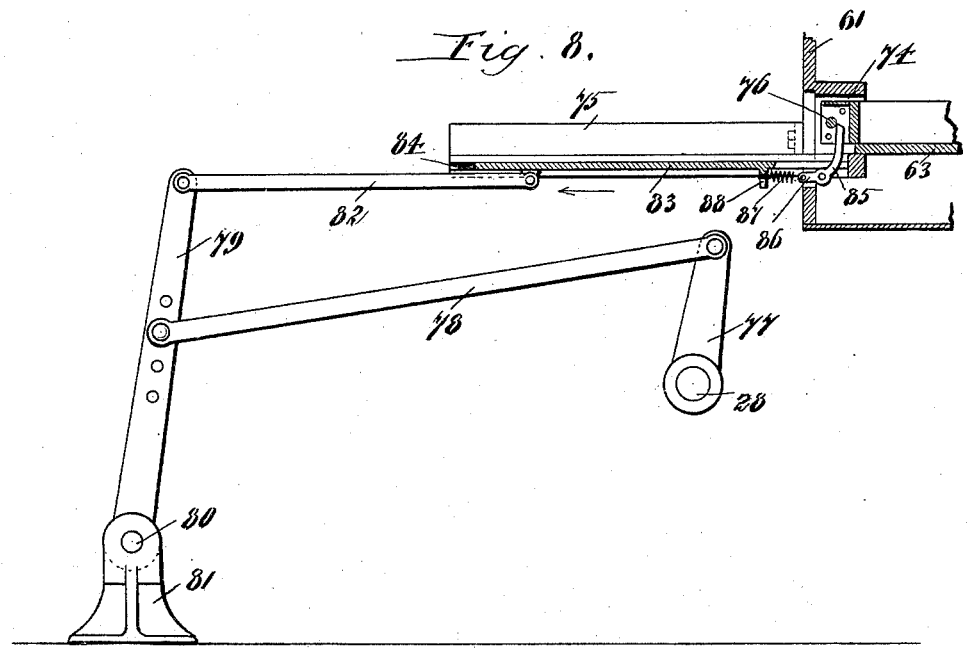
Figure 9:
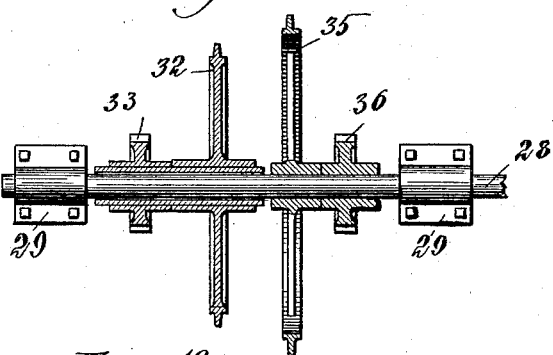
Figure 10:
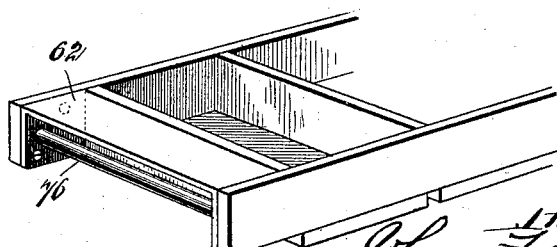

Figure 1 is a side elevation. Fig. 2 is an end view, the sander being removed. Fig. 3 is a vertical cross-section on line 3 3 of Fig. 1. Fig. 4 is an enlarged detail, being a side elevation of a portion of the carrying-chain. Fig. 5 is an enlarged detail, being a top view of the carrying-chain. Fig. 6 is a detail, being a vertical section of the sander on line 6 6 of Fig. 7. Fig. 7 is a vertical cross-section on line 7 7 of Fig. 1. Fig. 8 is an enlarged detail, being a side elevation of the mechanism for drawing the molds out of the sander. Fig. 9 is a detail, being a longitudinal vertical section through two of the drive-wheels; and Fig. 10 is an enlarged detail showing one end of a mold.

Our invention relates to brick-machines, and more especially to that class of brick-machines which are adapted to carry molds containing molded clay from a molding-machine to the place where the molded clay is to be dried.

The object of our invention is to provide an improved machine which will be adapted to remove the molds containing the molded clay from the molding-machine and after emptying the molds and depositing the molded clay upon a carrying-belt adapted to transport it to the place where it is to be dried will return the empty molds to the molding-machine ready sanded for further use. We accomplish this object as hereinafter specified, and as illustrated in the drawings.

That which we regard as new will be set forth in the claims.

In the drawings, 1 indicates a frame for supporting the various parts of the machine, which frame may be constructed in any manner suitable for this purpose. We prefer, however, to use a frame composed of beams connected together so as to form a rectangular frame, as shown in Figs. 1 and 2, as we have found this form to be best adapted for assembling and supporting the parts of the machine. The bed of the frame is preferably arranged to be of the same height as the table of an ordinary brick-molding machine, so that the molds may be taken from the molding-machine and easily transferred to the machine herein shown.

2 2' indicate sprocket-wheels, two of which are mounted at each end of the frame 1, the wheels at each end being arranged at opposite sides of the interior of the frame. The sprocket-wheels 2 at the inner end of the frame are mounted upon a common shaft 4, which extends through the frame and is mounted in suitable bearings 3, secured to the frame in any suitable manner, as best shown in Fig. 2. The sprocket-wheels 2' at the outer end of the frame are mounted upon a shaft 16, which is supported in suitable bearings 3, which are also secured to the frame 1 in any suitable manner.

5 5 indicate a carrying-chain, which is composed of two link belts preferably formed alternately of double links 6 and single links 7, arranged as shown in Fig. 5. The double links 6 are adapted to receive the sprockets upon the wheels 2, as best shown in Fig. 1. The carrying-chain passes around the sprocket-wheels 2 2' at opposite ends of the frame, one link-belt 5 being placed at each side of the machine. Each belt of the chain 5 is provided at regular intervals with lugs or projections 8, as best shown in Figs. 1 and 4, which lugs project outward, as shown, and are preferably made about as long as a brick-mold is deep. The sprocket-wheels 2 are mounted at such a height in the frame that the lower ends of the lugs upon the lower portion of the chain will extend nearly to the bed of the frame, as shown.

9 indicates rollers, which are mounted in suitable bearings in the bottom of the frame, as best shown in Fig. 3, and which extend horizontally across the frame. The rollers are placed at short intervals apart, as indicated by dotted lines in Fig. 1, so as to adapt them to support a mold as it is carried along by the chain 5.

At the farther end of the frame is secured a semicircular guide 10, which is curved to conform to the outline of the wheel 2' and is at a sufficient distance from the wheel to permit of the free passage of the chain 5 and lugs 8 around the wheel. The guide 10 may either be composed of a single sheet of metal or other suitable material extending entirely across the end of the machine, or it may consist of two or more strips of metal or other suitable material suitably secured at the end of the machine. The object of the guide 10 is to hold the molds upon the chain 5 as they are carried around the wheel 2' to the upper part of the frame. The latter construction is preferred.

11 indicates angle-irons, one of which is mounted at each side of the upper part of the frame, as best shown in Fig. 3. The angle-irons 11 are of the shape shown in Fig. 1, extending from the level of the chain 5 at the farther end of the machine forward and upward to a point near the center of the frame, and thence inclining gradually downward until the level of the chain 5 is again reached at the opposite end of the frame. The angle-irons 11 at their highest point are a little more than the height of a brick higher than the top of the chain 5 at the upper part of the machine. The angle-irons 11 are at such a distance apart and are so placed that they will be adapted to receive the opposite ends of a brick-mold and support it as it is moved along by the chain 5. The object of this construction will appear more fully hereinafter. Similarly located in the frame 1 are angle-irons 12, which are placed below the angle-irons 11 at about the level of the chain 5 at the upper part of the frame. In the drawings we have shown the irons 11 and 12 cast together; but, if desired, they may be made of separate pieces, as either construction may be used. When the irons are cast in one piece, it is necessary that an opening 13 should be made in the iron on one side of the machine, which opening is made at the point where the iron 11 is the highest. The opening 13 is of sufficient size to permit of the passage of a brick.

14 indicates a cross head, which is mounted upon one end of the shaft 4, which supports the sprocket-wheels 2. The shaft 4 is made to extend through its bearing to a point beyond the frame 1, so that the cross-head may be secured upon it outside of the frame, as best shown in Fig. 1. The shaft 4 is also provided with an extended portion 17, which extends slightly beyond the outer edge of the frame and is provided with ratchet-teeth as shown. The inner portion of the cross-head is also provided with ratchet-teeth adapted to mesh with the teeth upon the portion 17 of the shaft, as shown. The teeth upon the cross-head and shaft are so arranged that they form a clutch, so that by operating the cross-head the shaft and wheels 2 will be intermittently rotated in the direction indicated by the arrow in Fig. 1.

18 indicates a connecting-rod, which connects one end of the cross-head with a projecting arm 19 upon a lever 20, which lever is mounted upon the upper portion of the frame 1, being pivoted at one end, as at 21, to said frame.

22 indicates a portion of the pitman or connecting rod, by means of which the lever 20 may be operated. By moving the lever 20 upon its pivot the arm 19 will be raised or lowered and a rocking motion communicated to the cross-head 14. We do not wish to limit ourselves to the construction here shown for operating the cross-head, as many other common devices might be used for accomplishing this purpose.

23 and 24 indicate racks, which are of the shape shown in Fig. 1 and are perpendicularly mounted in guides 25, which are secured to the frame of the machine. The racks are arranged a short distance apart and are adapted to slide vertically in the guides 25. The rack 23 is connected by means of a rod 26 to one side of the cross-head 14, and the rack 24 is connected by means of a rod 27 with the opposite side of the cross-head 14, as best shown in Fig. 1. It will be seen that by rocking the cross-head 14 the racks 23 and 24 will be alternately moved upward or downward.

28 indicates a shaft, which is mounted in a horizontal position in suitable bearings 29 upon a downward extension 30 of the frame. Loosely mounted upon the shaft 28 is a sleeve 31, which carries a sprocket-wheel 32. The sleeve 31 also carries a gear-wheel 33, which is adapted to mesh with the teeth in the rack 23, as best shown in Fig. 1. Upon the shaft 28 is also mounted a sprocket-wheel 35 and a gear-wheel 36, both of which are keyed to the shaft, so that they will move with it, the gear-wheel 36 being adapted to mesh with the teeth upon the rack 24, as best shown in Fig. 1. The sprocket-wheels 32 and 35 are so placed as to occupy the space between the racks 23 and 24. The diameter of the wheel 32 is such that the wheel extends to about the level of the bottom of the frame 1, and the diameter of the wheel 35 is preferably somewhat greater than that of the wheel 32, as shown.

37 indicates a chain, which passes around the wheel 32 and a similar wheel, (not shown,) which is preferably suitably mounted upon the molding-machine. The chain 37 is adapted to carry the filled molds from the molding-machine to the chain 5.

38 indicates angle-irons arranged as shown in Fig. 1, which extend from the molding-machine to the frame 1, which angle-irons are as far apart as a mold is wide, being thus adapted to act as a guide and a support for the mold as it is moved along toward the frame 1 by the chain 37, the chain 37 being preferably arranged centrally below and between the two angle-irons 38, as best shown in Fig. 1. The machine here shown should be located near the point where the filled molds are delivered from the molding-machine, and the angle-irons 38 and chain 37 extend from that point to a point upon the frame 1 under the sprocket-wheels 2 at the inner end of the machine, so that by depositing a mold upon the angle-irons at the molding-machine it will be moved along the angle-irons by the chain 37 and be carried into the frame 1 under the wheel 2 in such position that it will be engaged by one of the lugs 8 upon the chain 5 and thence carried through the machine. Secured to the chain 37 is a platform or carriage 104, which is adapted to slide upon the angle-irons 38 to carry the molds. A spring-dog 39, Fig. 2, is mounted upon one end of the carriage 104 and is adapted to engage a mold when it rests upon the carriage, so that the mold will be carried along by the movement of the chain.

40 indicates a chain, which is adapted to be operated by the wheel 35, around which it passes at one end. The chain 40 passes transversely through the frame 1 near the bottom and also through a frame or rack 41, which will be hereinafter described and which is located at the opposite side of the frame 1, the chain being supported by and passing around a smaller sprocket-wheel 42, suitably mounted at the outer portion of the rack 41, as best shown in Fig. 2. The wheel 42 is mounted at such a height that the upper portion of the chain 40 will be horizontal, as shown. A spring-dog 43 is also mounted upon the outer end of a platform similar to the platform 104, which platform is secured to the chain 40 by means of a lug 105, as best shown in Fig. 2. The dog 43 projects upward and is provided with an arm 44, to which is secured a spring 45. The end of the spring 45 opposite to that by which it is secured to the arm 44 is secured to a lug 46, which projects downward from the platform above mentioned. By this construction the upper end of the dog 43 may be bent downward upon the platform, the tension of the spring 45 being adapted to hold the dog in an upright position, as shown. The rack 41 above mentioned consists of a frame of any suitable construction, which is adapted to hold a supply of palettes or boards adapted to be placed upon the filled molds, so that they may be overturned and the molded clay be deposited upon the palette. The rack 41 is of about the width and length of a palette and is placed next to the frame 1 in such position that a palette may be carried from the rack 41 lengthwise into the frame 1 and deposited over a brick-mold, the mold being simultaneously carried into the frame from the opposite side. The bed of the palette-rack 41 is preferably composed of angle-irons 47, adapted to support the platform or carriage above described and to act as guides upon which it may move into the frame 1. The dog 43 projects upward sufficiently to engage a palette when it rests upon the bottom of the rack 41. In operation, after one or more palettes have been deposited in the palette-rack by each operation of the machine the lowermost palette is carried from the palette-rack into the frame 1, as will be more fully hereinafter described.

48 indicates a supporting-frame, which is secured at the inner end of the frame 1 and projects forward beneath the sprocket-wheel 2 to a point over that which a mold would occupy on being inserted within the frame. The supporting-frame 48 preferably consists of a solid frame provided with slots for the passage of the lugs 8 upon the chain 5; but it may be made of separate strips of suitable material firmly secured at their outer ends to the bed of the frame 1. The supporting-frame 48 is adapted to receive a palette as it is carried in by the carriage on the chain 40 and to support it in such position that by the movement of the chain 5 it will be engaged by the lugs 8 and carried forward and deposited upon the filled mold. As the chain 5 moves around the drive-wheels 2 the lugs 8 will pass through the slots in the frame 48, and will carry the mold and palette along together.

49 indicates a scraper, which is mounted upon a rod 50, secured to the frame of the machine. The scraper is slightly spiral-shaped and projects horizontally over the angle-bars 38 at such a height that the lower edge of the scraper will bear upon the upper end of a mold as it is carried along into the machine. Any superfluous clay which may have lodged upon the upper part of the mold is thereby removed. The supporting-rod 50 is provided with an enlarged portion or lug 51 at its lower end, adapted to support the end of the scraper 49, and the rod 50 extends upward a short distance above the top of the scraper, as shown in Fig. 1. A spring 52 is mounted upon the rod 50, and is adapted to bear upon the top of the scraper 49 and the support for the upper part of the rod 50. By this construction the scraper may be moved slightly upward if it should strike any serious obstacle in its passage over the mold, the tendency of the spring 52 being to make the scraper bear more or less firmly upon the top of the mold. The shaft 16 at the outer end of the frame 1 projects through its bearings to the outside of the frame. Mounted upon each projecting end of the shaft 16 are wheels 53 and 54, each of which consists of a central hub provided with radial arms 55. The arms 55 are provided with an enlarged portion 56 at their ends, which enlarged portion is beveled or inclined on its inner side, as best shown in Fig. 3. If desired, the radial arms may be of uniform width, their outer ends being inclined, as shown; but I prefer to make them with the enlarged portions 56, for the reason that it secures a better bearing-surface.

57 and 58 indicate hammers, one of which is pivotally mounted at each side of the frame, as shown. At the opposite end of each hammer from that at which the head is located is provided an extension 59, which is of such shape that it is adapted to be engaged by the enlarged portions 56 upon the wheels 53 or 54, the outer edge of each extension 59 being beveled or inclined to correspond with the surface of the enlarged portion 56. The arrangement of the different parts is such that when the wheels 53 and 54 are moved in the direction indicated by the arrow in Fig. 1 the hammers 57 or 58 will be thrown outward by the inward pressure of the portion 56 upon the extension 59. When the enlarged portion 56 of one of the arms of the wheel 53 or 54 has passed beyond the extension 59, the hammer 58 will fall back to a vertical position. In order to cause the hammers 57 and 58 to fall downward with increased force, springs 60 are provided, one of which springs is attached to the lower portion of each hammer and to the frame of the machine, as best shown in Fig. 3. The wheels 53 and 54 are so arranged that they will cause the hammers to tap the opposite ends of each mold as it is carried opposite them in its passage through the machine, and the wheels 53 and 54 are also so arranged that they will cause the hammers 57 58 to strike the mold alternately, the object being to loosen the clay in the mold, so that the molded clay may be easily discharged from the mold.

61 indicates a cylindrical chamber, which is adapted to contain sand for sanding the molds after they are emptied of their contents and in which the devices for sanding the molds are located. The exterior of the chamber 61 may be made of any suitable material and is somewhat longer than the length of a mold. It is preferably supported upon an extension at the rear of the inner end of the frame, as shown in Fig. 1, and at such a height that the molds as they are delivered from it (as will be hereinafter more fully specified) will be about upon a level with the table of the molding-machine.

The sander 61 is provided at the top with an opening 62, which extends the length of the sander and is adapted to receive a mold 63, as shown in Fig. 6. Each end of the sander 61 is provided on the inside with a spiral guide or flange 64, which flange originates at the lower point of the opening 62 and thence continues in spiral form around the end of the cylinder to which it is attached. If desired, a guide 65 may also be provided for the inner portion of the cylinder, as best shown in Fig. 7, which guide forms a continuation of a portion of the exterior covering of the cylinder. The inner end of the guide 65 terminates in a plate 66, which extends upward toward the top of the interior of the sander. It is not necessary for the operation of my invention that both guides should be used, as either one alone would perform the work successfully; but the construction here shown is the one which we prefer to use.

67 indicates a wheel, two or more of which are mounted in the chamber 61. When two wheels 67 are used, they are located at opposite ends of the cylinder, and if more are used they may be distributed at suitable points throughout the interior of the chamber. The wheels 67 are mounted upon an axle 68, which is journaled in suitable bearings 69 70 in the ends of the cylinder.

71 indicates a sprocket-wheel, which is preferably mounted upon the shaft 68 at the end opposite that at which the mold is delivered from the sander, as best shown in Fig. 7. The wheel 71 is provided with a chain 72, by means of which it is geared to a sprocket-wheel upon an extension of the shaft 4, upon which are mounted the wheels 2. By this arrangement the wheels 67 within the sander will be rotated by the operation of the wheels 2. The wheels 67 are provided with a number of recesses, which are of the width of a mold and are preferably deep enough to hold two molds at a time, as best shown in Fig. 6.

74 indicates an opening in the end of the sander nearest to the molding-machine, which opening is adapted to permit of the passage of the molds from the interior of the sander. By this construction when a mold is delivered into the top of the sander it will be carried around the interior of the chamber and will be finally delivered through the opening 74. Leading from the opening 74 and on a level with the bottom of it are two angle-irons 75, which are so placed that they will act as guides to support the mold as it is drawn out of the sander. The molds are provided at each end with a cross-bar 76, which extends across the end, as best shown in Fig. 10. This construction is best adapted for use upon our improved machine, and it is so simple that the ordinary molds now in use may readily be similarly arranged. The object of this construction will appear hereinafter.

77 indicates a lever, which is mounted upon the shaft 28 centrally below the opening 74 in the sander, the shaft being made of such length as to permit of this arrangement. The lever 77 is keyed to the shaft 28, so that as the shaft rocks the lever 77 will move with it.

78 indicates a connecting-bar, which connects the lever 77 with a lever 79, which lever 79 is pivoted at 80 to a suitable support 81. The support 81 may be secured to the floor or arranged in any other suitable manner. The lever 79 extends above the point of its connection with the connecting-bar 78 to about the level of the bottom of the opening 74 in the sander.

82 indicates a connecting-rod, which is connected to the lever 79 near its upper end and extends backward a short distance and is secured to the under side of a sliding table 83, which is adapted to slide in grooves 84, formed in the lower part of the angle-irons 75.

85 indicates a spring-dog, which is pivoted to the inner end of the platform 83 and is provided with an arm 86, extending under the platform, to which arm is secured a spring 87, secured at its opposite end to a lug 88 on the under side of the platform. The dog 85 is adapted to be turned forward upon the platform by slight pressure, the tendency of the spring 87 being to hold it in an upright position. The construction and arrangement of the dog 85 and spring 87 is similar to that of the dog 43 and spring 45, hereinbefore described. The platform 83, with its dog, is adapted to be moved into the end of the opening 74 by the rocking of the lever 77, whereby when the mold is in the sander and at the opening 74 by the inward movement of the platform the dog 85 will be pushed backward against the rod 76 upon the end of the mold until it has been bent downward sufficiently to allow it to pass, when it will spring upward again into a perpendicular position. The mold will then be drawn outward by the movement of the platform 83 in an opposite direction.

89 indicates a hopper, which is mounted in any suitable manner at the top of the sander and is connected with the interior of the sander by a tube 90, which extends from the bottom of the hopper through one end of the cylinder.

91 indicates sprocket-wheels, one of which is secured near each end of a shaft 92, which is supported near the opening 62 of the sander by brackets 93, which are secured to the ends of the cylinder, as best shown in Fig. 1.

94 indicates a belt, one end of which passes around the sprocket-wheels 91 and the other end of which passes around similar wheels located upon a shaft 95, which is mounted in suitable bearings in the upper part of the frame 1 of the machine at about the position shown in Fig. 1. The belt or chain 94 is provided with straps 96 to be better adapted to carry the molds upon it.

97 indicates a beveled gear, which is mounted near one end of the shaft 95 at a point outside of the frame, as best shown in Fig. 1. The gear-wheel 97 is adapted to mesh with a similar wheel 98, which is mounted upon one end of a shaft 99, which shaft 99 is mounted in suitable bearings 100, secured to the upper part of the frame of the machine. Mounted upon the shaft 99 is a pulley 101, which pulley is at a point directly beneath the opening 13 under the angle-irons 11 at one side of the top of the frame 1. Passing around the pulley 101 is a belt 102, which passes from the machine to the point at which it is desired to deliver the bricks. The belt is preferably of about the width of a mold, so that it will be adapted to receive and carry from the machine a palette containing the molded clay. The shaft 95 extends outward a short distance beyond the gear-wheel 98 and has mounted thereon a pulley 103, as best shown in Fig. 1. The pulley 103 is adapted to be operated by a belt passing from the molding-machine or any other suitable source of power. By operating the pulley 103 the pulley 101 will be operated by means of the beveled gear and also the belt 94. The belt 94 is adapted to receive the empty molds from the carrying-chain 5 and transfer them into the sander through the opening 62.

For removing the palettes containing the molded clay from the interior of the frame after the molds have been lifted from over the molded clay we provide the following devices: 34 indicate rollers, which are mounted upon shafts 107, which are mounted on brackets 108, secured to the inner sides of the upper portion of the frame 1 and project into the frame under the drive-chain 5, as best shown in Fig. 3. 106 indicates a belt, which passes around the rollers 34 and is operated by the rotation of said rollers. The rollers 34 and belt 106 are best operated by means of a belt working upon pulleys mounted upon the shafts 107 and 99, as best shown by dotted lines in Fig. 3. Any approved driving mechanism, however, may be used. The upper portion of the belt 106 is upon such a level as to be adapted to receive a palette from the angle-irons 12 as it is moved along the frame by the carrying-chain and is rotated in the direction indicated by the arrow in Fig. 3, so that when the palette and molded clay are deposited upon the belt by the action of the carrying-chain they will be carried out of the frame through the opening 13 and deposited upon the belt 102, the belt 106 being located in the interior of the frame 1, opposite the opening 13. By this construction the molded clay is automatically carried out of the frame. We preferably make use of solid rollers 34 and a single belt 106; but, if desired, two or more belts 106 may be used working upon separate pulleys.

The operation of our improved machine is as follows: Our improved machine is adapted to be used in connection with a machine for molding clay into bricks, which molding-machine may be of any desired pattern. To secure the best results, it is best to so arrange the two machines that the point at which molds are inserted into the molding-machine to be filled will be opposite the opening 74, through which the molds are delivered from the sander, about the length of a mold away from said opening, and preferably upon about the same level as the opening 74. As it is usual to operate brick-molding machines by the use of steam-power, any suitable gearing may be provided for actuating the lever 22 to operate the other machine, as hereinbefore described. When our improved machine is in operation, as the connecting-bar 18 is moved downward by the operation of the lever 20 the rack 23 will be moved downward, which will cause the wheel 32 to revolve in the direction indicated by the arrow in Fig. 2. This will cause the carrying-chain 37 to move toward the interior of the machine, and a filled mold having been deposited upon said chain 37 from the molding-machine it will be carried toward the other machine for a distance determined by the adjustment of the connecting-bar 26 upon the cross-head 14 and also the adjustment of the connecting-rod 18 and lever 20. This adjustment is preferably made such that each actuation of the rack 23 will cause the chain 37 to move a distance equal to the length of one mold. At the same time that this operation takes place the rack 24, which is connected to the opposite arm of the cross-head 14 from that to which the rack 23 is connected, will be moved upward by the rocking of the cross-head, which movement will cause the wheel 35, through the cog-wheel 36, to move in the direction indicated by the arrow in Fig. 2, the motion of the wheel 35 being opposite to that of the wheel 32. As hereinbefore described, the wheels 32 and 35 are mounted upon and keyed to the shaft 28, so that by operating the cross-head the shaft 28 will be rocked in the direction in which the wheels 35 and 36 turn.

By the partial rotation of the wheel 35 the chain 40 will be moved in the direction indicated by the arrow in Fig. 2 for a greater or less distance, this distance being regulated in a similar manner to that of the chain 37, the movement being preferably equal to the length of a mold. As the chain 40 is moved as indicated, the dog 43 will carry the lowermost palette in the rack 41 into the machine and will deposit it upon the supporting-frame 48. By constructing the clutch 17 as herein described the above-described movement of the cross-head 14 will permit the wheels 2 and the chain 5 to remain stationary while the mold and palette are being carried into the machine. As the mold is being carried into the machine by the chain 37 any superfluous dirt will be scraped off by the scraper 49. By the reverse action of the lever 20 the cross-head 14 will be rocked in an opposite direction, which action will raise the rack 23 and lower the rack 24, causing the wheels 32 35 to rotate in directions opposite to those in which they were previously moved and consequently moving the chains 37 40 in opposite directions. As the chain 37 moves backward, if there should happen to be a mold already upon the angle-irons 38 when the dog 39 comes in contact with the front of said mold it will be turned downward and will pass under the mold until it reaches the rear end of the mold, when it will spring back again into a perpendicular position and be in readiness for carrying the mold forward when the action of the chain is reversed. In a similar manner the dog 43 will be turned downward by coming in contact with the front of one of the palettes in the rack 41 and will be moved back under the palette until it reaches the outer end of the palette-rack, when it will also be sprung into a perpendicular position by the action of the spring 45 and will be in readiness to carry another palette into the machine. When these operations are taking place, the teeth upon the cross-head 14 will engage the teeth upon the outer end of the portion 17 on the shaft 4 and will thereby cause the shaft and the wheels 2 2' to make a partial revolution in the direction indicated by the arrow in Fig. 1. As the wheel 2 moves around one of the lugs or arms 8 will come in contact with the edge of the palette upon the supporting-frame 48 and will move it forward, at the same time moving forward the mold which has been carried into the machine, as hereinbefore described. As the wheel continues its revolution the palette and mold will be carried forward along the frame 1, and as soon as they are carried beyond the supporting-frame 48 the palette will rest upon the top of the mold. The mold and palette will be carried forward along the interior of the machine for a distance equal to the length of one mold. As hereinbefore described, the cross-head will then move in the opposite direction and the wheels 2 2' will come to rest. By each successive action of the lever 20 the mold and palette in the machine will be carried forward a distance equal to the length of one mold and in due time will reach the hammers 57 58 at the outer end of the frame 1. The rollers 9 cause the molds to move more easily upon the frame. The arms 55 upon the wheel 54 are so adjusted that as the mold is brought almost opposite the hammers 58 the enlarged portion 56 upon one of the arms will engage the extended upper portion 59 of the hammer and will cause the head of the hammer to be thrown backward. The adjustment is such that the hammer will be raised so that it may fall to its perpendicular position just as a mold is opposite to it. The hammers on the opposite sides of the frame are also so adjusted that they will strike the opposite ends of a mold at different times, so that they will not neutralize each other. The object of this arrangement is to loosen the clay in the mold, so that it may readily be removed by the further operation of the machine. The springs 60 act to cause the hammers 57 58 to strike with greater force. After passing the hammers 57 58 the mold and palette will be carried around between the wheels 2' and guide 10 to the upper part of the machine. By this operation the mold will be overturned, so that the palette will rest upon the carrying-chain 5 and angle-irons 12 and the mold will rest partly upon the palette and partly upon the angle-irons 11, as the ends of the mold are arranged to project slightly beyond the palette and rest upon the angle-irons. As the chain continues its motion the mold will move up the incline of the angle-irons 11 and will consequently be raised from over the palette, leaving the molded clay upon the palette, which will rest upon the carrying-chain and angle-irons 12. The mold will continue to rise above the palette until it reaches the highest point of the angle-irons 11, when it will be clear of the molded clay upon the palette. The incline of the angle-irons 11 is so arranged and the opening 13 so placed that the wheels 2 and carrying-belt will stop when the mold is at its highest point and the palette, with the molded clay upon it, is opposite the opening 13. As soon as the palette is opposite the opening 13, it will be deposited upon the rollers 34, and will then be carried out of the machine by the rollers through the opening 13 and deposited upon the belt 102, which may be arranged to carry it to any desired point to be dried. As hereinbefore described, the belt 102 and rollers 34 are operated by means of the beveled gearing 97 98 and the pulley 103, which pulley is operated by suitable gearing from the molding-machine or other suitable source of power. By the further motion of the chain 5 the empty mold will be carried along the frame down the incline of the angle-irons 11 and will be deposited upon the belt 94, which, as has been described, is operated by means of sprocket-wheels arranged upon a shaft 95, which shaft is also operated by means of the pulley 103. The belt 94 moves in the direction indicated by the arrow in Fig. 1 and carries the mold upside down to the opening 62 of the sander, (see Fig. 6,) as has been before described. When the mold marked 63 in Fig. 6 has been deposited in the opening of the sander, its ends will rest upon the flanges 64 in the ends of the sander, and it will move by gravity upon said flange until it reaches the side of one of the recesses 73 in the wheels 67, when it will fit into said recess and will be moved around the interior of the sander by the rotation of the wheels 67. As has been described, the wheels 67 are mounted upon a shaft 68 and are rotated by means of a sprocket-wheel 71, which is geared by means of a suitable chain 72 or other gearing to a similar sprocket-wheel upon an extension of the shaft 4. It is evident that owing to the fact that the shaft 4 is rotated only by the return motion of the cross-head 14 the wheels 67 in the sander will not make a continuous rotation, but by each actuation of the lever 20 will make a partial rotation, such rotation corresponding to the rotation of the wheels 32 33. In this manner the molds in the sander will be moved around, and in their motion around said interior they will be filled with sand, the sand having been previously introduced into the interior of the sander through the hopper 89 and tube 90, as hereinbefore described. Owing to the spiral construction of the flanges 64, as the mold moves around the interior of the sander it will also approach the center of the sander, as best shown in Fig. 6. As the mold reaches the upper part of the sander it will be in an upturned position, as best shown in Fig. 6, and the extra sand will be thrown out of the mold. The extension 66 of the guide 65 serves as a deflector to cause the sand from the mold to collect in one side of the sander and to prevent it from falling into the mold after it has been sanded. After the mold has been carried around the sander it is deposited opposite the opening 74, the rotation of the wheels 67 being so adjusted as to cause the mold to arrive at that point at the end of an actuation of the cross-head 14, so that as the mold arrives opposite the opening the wheels 67 stop. The mold is now right side up. The wheels 35 and 36 are keyed to the shaft 28, so that when the rack 24 is moved downward by the rocking of the cross-head 14 it will cause the shaft 28 and lever 77 to rock toward the machine. This will cause the rod 82 and platform 83 to move toward the sander. The adjustment of the levers 77 and 79 is such that when the lever 77 reaches the limit of its inward motion the dog 85 upon the inner end of the platform 83 will be in the position shown in Fig. 8, the tooth of the dog being in engagement with the bar 76 upon the end of a mold. When the cross-head 14 moves in the opposite direction, it will cause the shaft 28 and lever 77 to rock outward from the machine and will consequently move the carriage 83 in the direction indicated by the arrow in Fig. 8, drawing the mold out of the sander. The levers 77 and 79 are so adjusted that by the rocking of the shaft 28 the platform 83 will move a distance equal at least to the length of a mold, so that when the platform 83 moves outward it will draw the mold entirely out of the sander. When the lever 77 rocks in an opposite direction, the dog 85 will be turned downward by its contact with the mold and will pass toward the sander under the mold until it engages the bar 76 upon the next mold, which has in the meantime been deposited opposite the opening by the operation of the machine. By the construction and arrangement here shown the operation of drawing the mold out of the sander takes place while the wheels 67 are stationary. The molding-machine is preferably placed at such a distance that it will be about the distance of one mold from the opening in the sander, as above described, so that when a mold is withdrawn from the sander and deposited upon the platform 83 by withdrawing another mold from the sander it will cause the mold previously withdrawn to be carried forward a distance equal to the length of a mold and deposited in suitable position to be refilled from the molding-machine. This arrangement, however, is not essential, as very little handling would be necessary to transfer the molds to the molding-machine.

We do not herein broadly claim the cylindrical shell having spiral flanges and devices for moving a mold round the interior of the shell, as exhibited in Figs. 6 and 7 of the drawings, as such will constitute the subject-matter of a separate application for Letters Patent.

That which we claim as new, and desire to secure by Letters Patent, is—

1. In a brick-machine, the combination, with a frame having drive-wheels at each end, of a carrying-chain adapted to be operated by said drive-wheels for carrying the filled molds from the lower to the upper portion of the frame to empty them of their contents, substantially as described.

2. In a brick-machine, the combination, with a frame, a drive-wheel at each end of said frame, and a carrying-chain adapted to be operated by said drive-wheels to carry the filled molds from the lower to the upper portion of said frame, of a curved guide at one end of the frame, said guide being adapted to hold the mold in contact with the carrying-chain as it passes to the upper part of the frame, substantially as and for the purpose specified.

3. In a brick-machine, the combination, with a frame, a carrying-chain mounted in said frame and adapted to carry filled molds to the upper portion of said frame, and mechanism for operating said carrying-chain, of mechanism for introducing filled molds into the lower part of said frame, substantially as and for the purpose specified.

4. In a brick-machine, the combination, with a frame and a carrying-chain mounted in said frame and adapted to carry filled molds to the upper portion thereof, of mechanism for introducing filled molds into the lower portion of said frame and mechanism for introducing palettes into the frame over the molds, substantially as and for the purpose specified.

5. In a brick-machine, the combination, with a frame and carrying-chain mounted in said frame adapted to carry filled molds along the frame, of a carrying-chain for introducing filled molds into the frame and mechanism for alternately operating the two carrying-chains, substantially as and for the purpose specified.

6. In a brick-machine, the combination, with a frame, a carrying-chain adapted to carry filled molds from the bottom to the top of the frame and there empty them of their contents, and mechanism for operating said chain, of wheels and chains operated by said chain-driving mechanism for introducing molds and palettes simultaneously into the lower part of said frame, said wheels and chains being so arranged as to introduce the molds and palettes into the frame from opposite sides, substantially as described.

7. In a brick-machine, the combination, with a frame, a carrying-chain mounted in said frame and adapted to carry molds from the lower to the upper portion of said frame, drive-wheels adapted to operate said chain, and mechanism for carrying molds into the lower part of the frame, of a cross-head adapted to be rocked to alternately drive said wheels and the mold-introducing mechanism, substantially as and for the purpose specified.

8. In a brick-machine, the combination, with a frame 1 and wheels 2 2', mounted in said frame at opposite ends, of a carrying-chain 5, mounted upon said wheels and adapted to be driven by the rotation of said wheels, said chain having lugs or arms 8, and guides 10 at one end of the frame, said guides being adapted to hold a mold in contact with the carrying-chains, substantially as and for the purpose specified.

9. In a brick-machine, the combination, with a frame, driving-wheels mounted in said frame, and a carrying-chain adapted to be operated by said driving-wheels to carry molds from the lower to the upper portion of the frame, of devices upon the upper portion of the frame for emptying the molds of their contents, substantially as and for the purpose specified.

10. In a brick-machine, the combination, with a frame 1, sprocket-wheels 2 2', mounted at opposite ends of said frame, and a carrying-chain adapted to be operated by said wheels to carry molds to the upper portion of said frame, of inclines at the top of said frame adapted to remove the molds from the molded clay, substantially as specified.

11. In a brick-machine, the combination, with a frame, drive-wheels mounted in said frame at opposite ends, and a carrying-chain adapted to carry molds from the lower to the upper portion of said frame, of devices for striking the molds to loosen their contents, substantially as described.

12. In a brick-machine, the combination, with a frame, drive-wheels mounted at opposite ends of said frame, and a carrying-chain adapted to carry molds from the lower to the upper portion of the frame to empty them of their contents, of devices for striking the ends of the molds to loosen their contents, said devices being operated by the rotation of one of the drive-wheels, substantially as described.

13. In a brick-machine, the combination, with a frame, drive-wheels mounted at opposite ends of said frame, and a carrying-chain adapted to carry molds from the lower to the upper portion of the frame to empty them of their contents, of wheels 53 and 54, mounted upon the axle of one of the drive-wheels, said wheels 53 and 54 having radial arms 55, and hammers 57 and 58, adapted to be operated by the rotation of the wheels 53 and 54 to alternately strike the ends of the molds, substantially as and for the purpose specified.

14. In a brick-machine, the combination of a frame and devices for moving the molds along the lower portion of said frame with hammers 57 and 58, pivoted near their upper ends to said frame, the upper ends of said hammers being beveled or inclined, and devices for periodically striking the inclined surface of the upper portions of the hammers 57 and 58 to cause the hammers alternately to strike the mold as it passes between them, substantially as and for the purpose specified.

15. In a brick-machine, the combination, with a frame, drive-wheels mounted at the outer and inner ends of said frame, and a carrying-chain 5, adapted to be operated by said drive-wheels, the drive-wheels upon the inner end of the frame being mounted upon a shaft 4, of a cross-head 14, mounted upon the end of the shaft 4, said cross-head being adapted to rotate the shaft 4 only when rocked in one direction, mechanism for rocking said cross-head, and mechanism operated by said cross-head for introducing molds and palettes into the machine, substantially as and for the purpose specified.

16. In a brick-machine, the combination, with a frame 1, inner and outer drive-wheels 2 2', mounted in said frame, carrying-chains adapted to be operated by the drive-wheels to carry molds to the upper part of the frame, and cross-head 14, adapted to be rocked to operate the drive-wheels when moved in one direction, of rack 23, wheel 33, mounted upon a sleeve 31, a shaft 28, supporting said sleeve, sprocket-wheel 32, mounted upon said sleeve, chain 37 for carrying filled molds into the lower portion of the frame 1, and connecting-rod 26 for connecting said rack with one arm of the cross-head 14, substantially as and for the purpose specified.

17. In a brick-machine, the combination, with a frame 1, inner and outer drive-wheels 2 2', mounted in said frame, carrying-chains adapted to be operated by the drive-wheels to carry molds to the upper part of the frame, and cross-head 14, adapted to be rocked to operate the drive-wheels when moved in one direction, of rack 24, connecting-rod 27, connecting the upper end of the rack to one arm of the cross-head 14, wheel 36, adapted to be rotated by the vertical movement of the cross-head, said wheel 36 being mounted upon and keyed to a shaft 28, sprocket-wheel 35, mounted upon said shaft, and chain 40, adapted to carry palettes into the frame, substantially as and for the purpose specified.

18. In a brick-machine, the combination, with a frame and mechanism for carrying molds from the lower to the upper portion of the frame, of sprocket-wheel 32, chain 37, adapted to carry filled molds into the lower portion of the frame, sprocket-wheel 35, chain 40, adapted to be operated by said sprocket-wheel to carry palettes into the frame, a supporting-frame 48, adapted to receive a palette from the chain 40 and support it over the mold, and mechanism for simultaneously rotating the wheels 32 and 35 in opposite directions, substantially as specified.

19. In a brick-machine, the combination, with a frame and mechanism for carrying molds from the lower to the upper portion of the frame, of angle-irons 38, adapted to act as supports upon which the molds may be moved as they are carried to the frame, sprocket-wheel 32, chain 37 for moving said molds along the angle-irons 38, and mechanism for operating said sprocket-wheel, substantially as described.

20. In a brick-machine, the combination, with a frame, drive-wheels 2 2', mounted in the opposite ends of said frame, and a carrying-chain adapted to be operated by said drive-wheels to carry filled molds from the lower to the upper portion of said frame, of inclined angle-irons 11, mounted at opposite sides of the upper portion of the frame, said angle-irons being adapted to raise the mold from the molded clay, substantially as and for the purpose specified.

21. In a brick-machine, the combination, with a frame, drive-wheels mounted at opposite ends of said frame, and carrying-chains adapted to carry filled molds from the lower to the upper portion of the frame, of angle-irons adapted to lift the molds from the molded clay and a belt 102, adapted to carry off the molded clay, substantially as described.

22. In a brick-machine, the combination, with a frame, wheel 32, and chain 37 for introducing molds into the lower portion of said frame, of a vertically-movable scraper 49, adapted to scrape the upper surface of a mold, rod 50 for supporting said scraper, and spring 52, substantially as and for the purpose specified.

23. In a brick-machine, the combination, with a frame and mechanism mounted in said frame adapted to carry filled molds from the lower to the upper portion of the frame and empty them of their contents, of a sander adapted to receive the empty molds and devices operated by the mold-carrying mechanism for moving the molds around the interior of the sander, substantially as and for the purpose specified.

24. In a brick-machine, the combination, with a frame and mechanism mounted in said frame adapted to carry filled molds from the lower to the upper portion of said frame and to empty them of their contents, of a sander adapted to receive the empty molds from the mold-carrying mechanism, spiral flanges 64 in the opposite ends of the interior of the sander, said flanges being adapted to receive and support the ends of the molds, an opening in the lower portion of one end of the sander for withdrawing the molds, and devices for moving the molds around the interior of the sander upon the flanges 64 to said opening, substantially as described.

25. In a brick-machine, the combination, with a frame and mechanism for carrying filled molds from the lower to the upper part of the frame and emptying them of their contents, of a sander adapted to receive the empty molds from the mold-carrying mechanism, interior spiral flanges 64, an opening in the lower portion of one end of the sander, wheels 67, adapted to receive and carry the molds around the interior of the sander to the said opening, and mechanism for rotating said wheels, substantially as described.

26. In a brick-machine, the combination, with a frame and mechanism for carrying filled molds from the lower to the upper portion of the frame and emptying them of their contents, of a sander mounted upon said frame and adapted to receive empty molds from the mold-carrying mechanism, interior spiral flanges 64 in opposite ends of said sander, an opening 74 in the lower portion of one end of the sander, wheels 67, adapted to receive the molds and carry them around the interior of the sander to the opening 74, said wheels being mounted upon a shaft 68, and sprocket-wheel 71 on the outer end of said shaft, said wheel being geared to and driven from the mold-carrying mechanism, substantially as and for the purpose specified.

27. In a brick-machine, the combination, with a frame, drive-wheels mounted in said frame, mechanism for operating said drive-wheels, carrying-chain adapted to carry filled molds from the lower to the upper portion of the frame, and devices for emptying the molds of their contents, of a sander adapted to receive the empty molds from the carrying-chain, an opening in the lower portion of one end of the sander for the withdrawal of the molds, and devices for withdrawing the molds from the sander, said devices being adapted to be operated by the mechanism which operates the drive-wheels, substantially as described.

28. In a brick-machine, the combination, with a frame 1, shaft 4, mounted in said frame, cross-head 14 on said shaft, rock-shaft 28, mounted in the lower portion of the frame and adapted to be rocked, and devices for rocking said rock-shaft from the cross-head 14, of a lever 77, mounted upon one end of the rock-shaft, connecting-rod 78, lever 79, rod 82, guides 84, and platform 83, adapted to move in said guides, said platform having a dog 85 upon its inner end adapted to engage the end of a mold, substantially as and for the purpose specified.

29. In a brick-machine, the combination, with a frame and mechanism for carrying filled molds from the lower to the upper portion of said frame, of angle-irons at the upper portion of said frame for raising the molds from the molded clay and mechanism for automatically carrying the molded clay from the frame, substantially as and for the purpose specified.

30. In a brick-machine, the combination, with a frame, carrying-chains mounted in said frame, mechanism for operating said carrying-chains for carrying filled molds from the lower to the upper portion of the frame, and devices located at the upper portion of the frame for emptying the molds of their contents, of a belt mounted transversely in the upper portion of said frame and adapted to receive and carry the molded clay from the interior of the frame, substantially as and for the purpose specified.

31. In a brick-machine, the combination, with a frame, a carrying-chain mounted in said frame, mechanism for operating said chain to carry filled molds from the lower to the upper portion of the frame, belt 102, adapted to carry the molded clay from the frame, and devices located at the upper portion of said frame to empty the molds of their contents, of rollers 34, mounted transversely in said frame, belt 106, adapted to be operated by said rollers to carry the molded clay out of the frame and to deposit it upon the belt 102, and mechanism for operating said rollers, substantially as and for the purpose specified.

32. In a brick-machine, the combination, with mold-carrying mechanism, of a sander arranged to receive the empty molds from the carrying mechanism and provided with rotating devices for carrying the molds back to the carrying mechanism and with means for sanding such molds as they are returned to the carrying mechanism, substantially as described.

33. In a brick-machine, the combination, with a frame and mechanism for carrying filled molds from the lower to the upper portion of the frame and to empty them of their contents, a sander located at one end of the frame and adapted to receive the empty molds from the mold-carrying mechanism, and sprocket-wheels 91, mounted upon a shaft 92, supported by the sander, a shaft 95, and sprocket-wheels mounted upon said shaft, of a belt 94, adapted to be operated by said sprocket-wheels to convey the molds from the upper portion of said frame to the opening in the sander, and mechanism for operating the shaft 95, substantially as specified.

JOHN FARNEN.
JOHN MULLOY.

Witnesses:
JOHN L. JACKSON,
CHARLES H. JACKSON.